(12) United States Patent
Motoki

(10) Patent No.: US 9,991,804 B2
(45) Date of Patent: Jun. 5, 2018

(54) BUS CONTROLLER INCLUDING FEEDBACK CONTROL UNIT REDUCING POWER CONSUMPTION

(71) Applicant: ROHM CO., LTD., Ukyo-Ku, Kyoto (JP)

(72) Inventor: Kenichi Motoki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days. days.

(21) Appl. No.: 15/099,922

(22) Filed: Apr. 15, 2016

(65) Prior Publication Data

US 2016/0308452 A1 Oct. 20, 2016

(30) Foreign Application Priority Data

Apr. 17, 2015 (JP) .................................. 2015-085078

(51) Int. Cl.
*H02M 3/335* (2006.01)
*H02J 7/02* (2016.01)
*H02M 1/00* (2006.01)

(52) U.S. Cl.
CPC ......... *H02M 3/33523* (2013.01); *H02J 7/022* (2013.01); *H02M 3/33576* (2013.01); *H02M 2001/0025* (2013.01); *H02M 2001/0032* (2013.01); *Y02B 70/16* (2013.01)

(58) Field of Classification Search
CPC . H02M 2001/0025; H02M 2001/0032; H02M 2001/0048; H02M 3/335; H02M 3/33507; H02M 3/33523; H02M 3/33576; H02J 7/022; Y02B 70/16
See application file for complete search history.

(56) References Cited

U.S. PATENT DOCUMENTS

| | | | | |
|---|---|---|---|---|
| 2001/0007530 A1* | 7/2001 | Hosotani | ........... | H02M 3/33569 363/20 |
| 2004/0066662 A1* | 4/2004 | Park | ........................ | H02J 9/005 363/21.02 |
| 2010/0072966 A1* | 3/2010 | Mayell | .............. | H02M 3/33523 323/284 |

(Continued)

FOREIGN PATENT DOCUMENTS

JP 2010074959 A 4/2010

*Primary Examiner* — Fred E Finch, III
(74) *Attorney, Agent, or Firm* — Cantor Colburn LLP

(57) ABSTRACT

A power supply apparatus is provided, that supplies a bus voltage $V_{BUS}$ to a detachable device. A DC/DC converter generates a DC voltage $V_{OUT}$ used as the bus voltage $V_{BUS}$. A USB controller receives the DC voltage $V_{OUT}$ as a power supply voltage, and detects whether or not the device is connected. The DC/DC converter generates the DC voltage $V_{OUT}$ such that (i) when the device is detected, the DC voltage $V_{OUT}$ has a specified voltage level, and such that (ii) when the device is not detected, the DC voltage $V_{OUT}$ has a voltage level that is lower than the specified voltage level and that is higher than a minimum operating voltage level required to operate the USB controller.

9 Claims, 7 Drawing Sheets

(56) References Cited

U.S. PATENT DOCUMENTS

| | | | |
|---|---|---|---|
| 2010/0195355 A1* | 8/2010 | Zheng | H02M 3/33507 363/21.12 |
| 2010/0202161 A1* | 8/2010 | Sims | H02M 7/02 363/20 |
| 2012/0262950 A1* | 10/2012 | Nate | H02J 9/005 363/16 |
| 2015/0115931 A1* | 4/2015 | Noh | H02M 3/04 323/351 |
| 2015/0212566 A1* | 7/2015 | Bodnar | H02M 3/33515 713/320 |
| 2015/0285872 A1* | 10/2015 | Chung | H02M 1/15 324/764.01 |
| 2015/0349651 A1* | 12/2015 | Morota | H02M 3/33523 363/21.15 |
| 2016/0241148 A1* | 8/2016 | Kizilyalli | H05K 5/0247 |
| 2016/0294273 A1* | 10/2016 | Kawamura | H02M 3/33523 |
| 2016/0352232 A1* | 12/2016 | Chang | G06F 1/266 |

\* cited by examiner

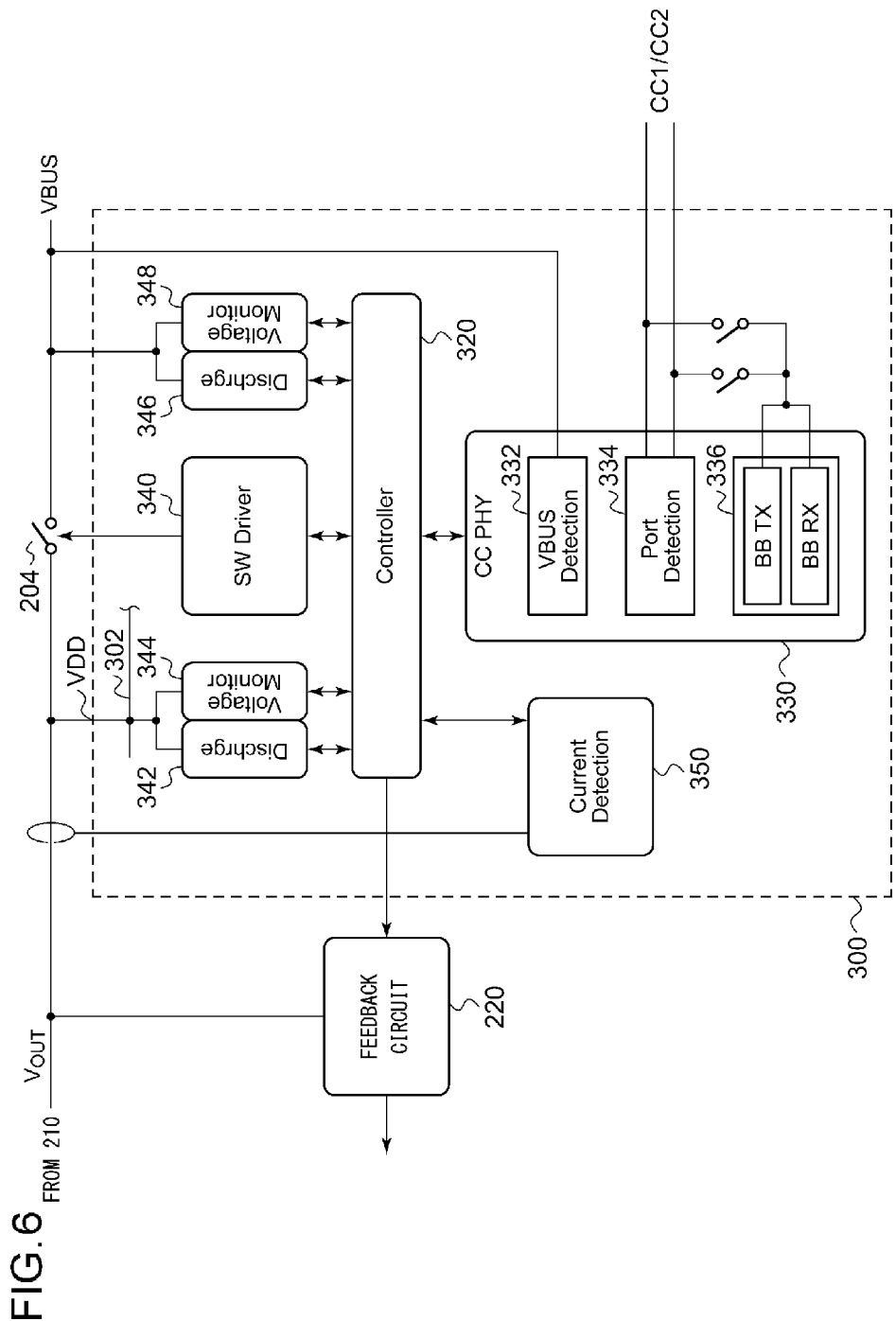

BUS CONTROLLER INCLUDING FEEDBACK CONTROL UNIT REDUCING POWER CONSUMPTION

CROSS-REFERENCE TO RELATED APPLICATIONS

This application is based upon and claims the benefit of priority from the prior Japanese Patent Application No. 2015-085078, filed Apr. 17, 2015, the entire contents of which are incorporated herein by reference.

BACKGROUND OF THE INVENTION

1. Field of the Invention

The present invention relates to a power supply apparatus that supplies a bus voltage to a device and a bus controller employed in the power supply apparatus.

2. Description of the Related Art

In recent years, various kinds of electronic devices (which will be simply referred to as the "devices" hereafter) such as smartphones, tablet terminals, laptop personal computers, portable audio players, digital still cameras, digital video cameras, and the like, are configured to conform to the USB (Universal Serial Bus) standard or the like, which allows electric power to be supplied via a cable.

In particular, in addition to a chargeable secondary battery, a battery-driven device includes a charger circuit in order to charge the secondary battery. Known examples of such charger circuits include an arrangement that charges such a secondary battery using a DC voltage supplied from a USB (Universal Serial Bus) host adapter via a USB cable.

At present, charger circuits to be mounted on mobile devices conform to a specification which is referred to as the "USB Battery Charging Specification" (which will be referred to as the "BC specification" hereafter). There are several kinds of host adapters. In revision 1.2 of the BC specification, SDP (Standard Downstream Port), DCP (Dedicated Charging Port), and CDP (Charging Downstream Port) have been defined as the kinds of chargers. The current (current capacity) that can be supplied by a host adapter is determined according to the kind of charger. Specifically, DCP and CDP are defined to provide a current capacity of 1500 mA. Also, SDP is defined to provide a current capacity of 100 mA, 500 mA, or 900 mA, according to the USB version.

As a next-generation secondary battery charging method using USB, a specification which is referred to as the "USB Power Delivery Specification" (which will be referred to as the "PD specification" hereafter) has been developed. The PD specification allows the available power to be dramatically increased up to a maximum of 100 W, as compared with the BC standard, which provides a power capacity of 7.5 W. Specifically, the PD specification allows a bus voltage $V_{BUS}$ that is higher than 5 V (specifically, 12 V or 20 V). Furthermore, the PD specification allows a charging current that is greater than that defined by the BC specification (specifically, the PD specification allows a charging current of 2 A, 3 A or 5 A).

A host adapter that supplies electric power to a device includes a DC/DC converter that generates a DC voltage used as a bus voltage. In recent years, from the viewpoint of power saving, there is a demand for a power supply apparatus having power consumption that is further reduced as much as possible when it operates with a light load or otherwise operates without a load (which will be referred to as the "standby state"). In order to meet this demand, a DC/DC converter operates in a so-called burst mode (which will also be referred to as the "PFM mode") in the standby state. In the burst mode, a switching transistor is switched on and off once or otherwise several times such that an output voltage becomes greater than a target level, and suspends the switching of the switching transistor until the output voltage drops to a lower limit level determined according to the target level of the output voltage. Such an arrangement reduces the electric power used to switch on and off the switching transistor (the electric power required to charge and discharge the gate capacitance of the switching transistor, for example), thereby providing improved efficiency.

However, there appears to be no end to the demand for reducing power consumption, and so such a power supply apparatus is required to provide further reduced power consumption.

SUMMARY OF THE INVENTION

The present invention has been made in order to solve such a problem. Accordingly, it is an exemplary purpose of an embodiment of the present invention to provide a power supply apparatus having reduced power consumption.

An embodiment of the present invention relates to a bus controller. The bus controller is employed together with a DC/DC converter that generates a DC voltage used as a bus voltage to be supplied to a detachable device, and is configured as a power supply apparatus. The DC/DC converter comprises: a transformer having a primary winding and a secondary winding; a secondary-side rectifier circuit that is connected to the secondary winding, so as to output the DC voltage; a switching transistor connected to the primary winding; a photocoupler comprising a light-emitting element and a light-receiving element; a feedback circuit comprising a shunt regulator that is connected to the light-emitting element of the photocoupler, and that drives the light-emitting element with a current that corresponds to a difference between a detection voltage that corresponds to the DC voltage and a reference voltage; a primary-side controller that switches on and off the switching transistor according to a feedback signal that corresponds to a current that flows through the light-receiving element of the photocoupler; and the bus controller arranged on a secondary side of the transformer, and that detects whether or not the device is connected or disconnected. The bus controller comprises: a power supply terminal that is connected to an output of the secondary-side rectifier circuit, and that receives the DC voltage as a power supply voltage; a detector that detects whether or not the device is connected; and a feedback control unit that controls the feedback circuit such that (i) when the device is detected, the DC voltage is generated so as to have a specified voltage level, and such that (ii) when the device is not detected, the DC voltage is generated so as to have a voltage level that is lower than the specified voltage level and that is higher than a minimum operating voltage required to operate the bus controller.

When no device is connected, the DC voltage is lowered in a range that allows the bus controller to operate. This reduces power consumption of the bus controller itself. Furthermore, this reduces power consumption on the secondary side of the DC/DC converter.

With an embodiment, also, the power supply apparatus may further comprise: a connector via which the device is detachably connected; and an output switch arranged between the output of the secondary-side rectifier circuit and the connector. Also, the power supply terminal of the bus controller may be connected between the output of the secondary-side rectifier circuit and the output switch.

Such an arrangement is capable of switching between a state in which the bus voltage is output via the connector (which will also be referred to as the "hot state") and a state in which the bus voltage is not output (which will also be referred to as the "cold state") while maintaining the power supply to the bus controller.

With an embodiment, also, the bus controller may further comprise a switch control unit that performs a control operation such that (i) when the device is detected, the output switch is turned on, and such that (ii) when the device is not detected, the output switch is turned off.

Depending on the bus standard, it is recommended that the bus voltage be set to zero (open state) (which will also be referred to as the "cold state"). Such an arrangement also supports such a standard.

With an embodiment, also, the bus controller may further comprise a communication unit that communicates with the device. Also, the feedback control unit may select one from among multiple specified voltage levels based on a communication between the communication unit and the device.

With an embodiment, also, the feedback control unit may switch the reference voltage so as to switch the voltage level of the DC voltage.

With an embodiment, also, the feedback circuit may further comprise a voltage dividing circuit that divides the DC voltage with a variable voltage dividing ratio so as to generate the detection voltage. Also, the feedback control unit may switch the voltage dividing ratio of the voltage dividing circuit so as to switch the voltage level of the DC voltage.

Also, the bus controller may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Also, the bus controller may conform to the USB Type-C specification. Also, the bus controller may conform to the USB-PD specification. Also, the bus controller may conform to the Quick Charge specification.

Another embodiment of the present invention relates to a power supply adapter. The power supply adapter supplies a bus voltage to a detachable device. The power supply adapter may comprise: an input rectifier circuit that rectifies an AC voltage; a DC/DC converter that receives an output voltage of the input rectifier circuit so as to generate a DC voltage to be used as the bus voltage; and any one of the aforementioned bus controllers.

Yet another embodiment of the present invention relates to a power supply apparatus that supplies a bus voltage to a detachable device. The power supply apparatus comprises: a DC/DC converter that generates a DC voltage used as the bus voltage; and a bus controller that receives the DC voltage as a power supply voltage, and that detects whether or not the device is connected. The DC/DC converter generates the DC voltage such that (i) when the bus controller detects the device, the DC voltage has a specified voltage level, and such that (ii) when the bus controller detects no device, the DC voltage has a voltage level that is lower than the specified voltage level and that is higher than a minimum operating voltage required to operate the bus controller.

With such an embodiment, when no device is connected, the DC voltage is lowered in a range that allows the bus controller to operate. This reduces power consumption of the bus controller. Furthermore, this reduces power consumption on the secondary side of the DC/DC converter.

Also, the power supply apparatus according to an embodiment may further comprise: a connector via which the device is detachably connected; and an output switch arranged between an output of the DC/DC converter and the connector. Also, a power supply terminal of the bus controller may be connected between the output of the DC/DC converter and the output switch.

Also, the bus controller may perform a control operation such that (i) when the device is detected, the output switch is turned on, and such that (ii) when the device is not detected, the output switch is turned off.

Also, the bus controller may select one from among multiple specified voltage levels according to a negotiation between the bus controller and the device.

Also, the DC/DC converter may be configured as an insulated DC/DC converter. Also, the DC/DC converter may comprise: a transformer having a primary winding and a secondary winding; a secondary-side rectifier circuit that is connected to the secondary winding, so as to output the DC voltage; a switching transistor connected to the primary winding; a photocoupler comprising a light-emitting element and a light-receiving element; a feedback circuit comprising a shunt regulator that is connected to the light-emitting element of the photocoupler, and that drives the light-emitting element with a current that corresponds to a difference between a detection voltage that corresponds to the DC voltage and a reference voltage configured as a target value thereof; and a primary-side controller that switches on and off the switching transistor according to a feedback signal that corresponds to a current that flows through the light-receiving element of the photocoupler.

Also, the bus controller may switch the reference voltage so as to switch the voltage level of the DC voltage.

Also, the feedback circuit may further comprise a voltage dividing circuit that divides the DC voltage with a variable voltage dividing ratio so as to generate the detection voltage. Also, the bus controller may switch the voltage dividing ratio of the voltage dividing circuit so as to switch the voltage level of the DC voltage.

Also, the power supply apparatus may conform to the USB Type-C specification. Also, the power supply apparatus may conform to the USB-PD specification. Also, the power supply apparatus may conform to the Quick Charge specification.

Yet another embodiment of the present invention relates to a power supply adapter. The power supply adapter comprises: an input rectifier circuit that rectifies an AC voltage; and any one of the aforementioned power supply apparatuses that receive an output voltage of the input rectifier circuit.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a function block diagram showing a USB controller that conforms to the USB-PD specification and the USB Type-C specification.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
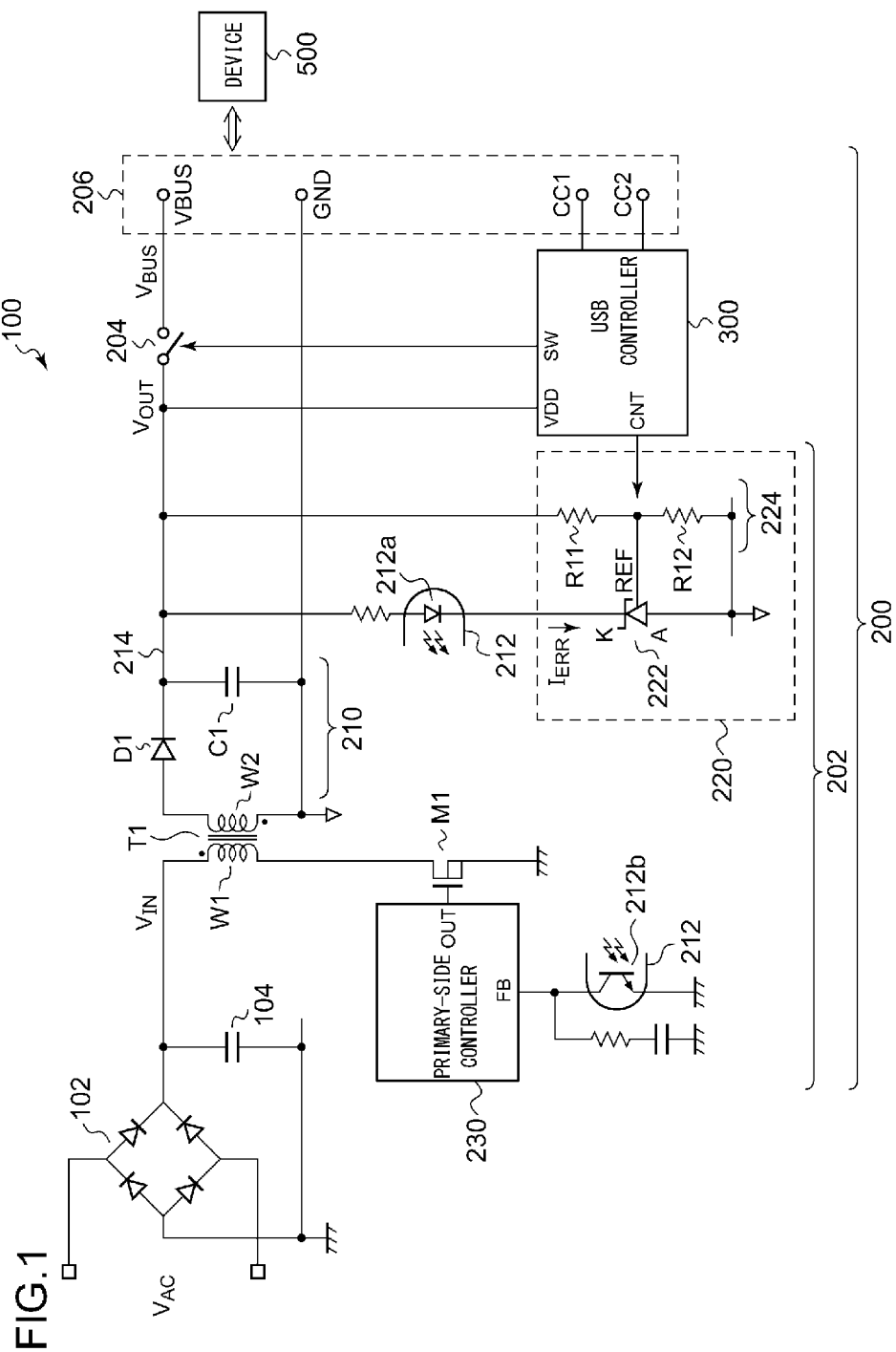
FIG. 1 is a block diagram showing a power supply adapter including a USB (Universal Serial Bus) controller according to an embodiment.

FIG. 1 is a block diagram showing a power supply adapter 100 including a USB (Universal Serial Bus) controller 300 according to an embodiment. The power supply adapter 100 conforms (i.e. compliant or compatible) to the USB standard. The power supply adapter 100 supplies a bus voltage $V_{BUS}$ to a device 500 configured as a load that is detachably connected to the power supply adapter 100.

In the present embodiment, the power supply adapter 100 is configured as an AC adapter that receives an AC voltage $V_{AC}$ so as to generate the bus voltage $V_{BUS}$. The power supply adapter 100 is configured as an AC/DC converter including an input rectifier circuit 102, a smoothing capacitor 104, and a power supply apparatus 200. The input rectifier circuit 102 rectifies the AC voltage $V_{AC}$. For example, the input rectifier circuit 102 may be configured as a diode bridge circuit that full-wave rectifies the AC voltage $V_{AC}$. The smoothing capacitor 104 is connected to the output of the input rectifier circuit 102, so as to smooth the output voltage of the input rectifier circuit 102.

The power supply apparatus 200 receives the output voltage of the input rectifier circuit 102 as an input voltage $V_{IN}$, and steps down the input voltage $V_{IN}$ so as to convert the input voltage $V_{IN}$ into a DC output voltage $V_{OUT}$. The output voltage $V_{OUT}$ is supplied to the device 500 as a bus voltage $V_{BUS}$.

The power supply apparatus 200 includes a DC/DC converter 202, an output switch 204, and a USB controller 300. The power supply adapter 100 includes a connector 206. The connector 206 is configured as a receptacle or otherwise a plug. The connector 206 is directly connected to the device 500 or otherwise is connected to the device 500 via a USB cable. The DC/DC converter 202 receives the output voltage $V_{IN}$ of the input rectifier circuit 102, so as to generate the DC voltage $V_{OUT}$ that is to be used as the bus voltage $V_{BUS}$. The output switch 204 is arranged between an output 214 of the DC/DC converter 202 and the connector 206.

A power supply (VDD) terminal of the USB controller 300 is connected to a node between the DC/DC converter 202 and the output switch 204. The USB controller 300 operates receiving the DC voltage $V_{OUT}$ as a power supply voltage. The USB controller 300 is configured to be capable of detecting at least the presence or absence of the device 500 configured as a load.

(i) When the USB controller 300 has detected the device 500, the DC/DC converter 202 generates the DC voltage $V_{OUT}$ having a specified level. On the other hand, (ii) when the USB controller 300 has detected no device 500, the DC/DC converter 202 generates the DC voltage $V_{OUT}$ having a standby voltage level $V_0$ that is determined so as to be lower than the specified voltage level. The standby voltage level $V_0$ is determined so as to be higher than a minimum operating voltage $V_{MIN}$ designed for the USB controller 300. Specifically, the standby voltage level $V_0$ may be set so as to be slightly higher than the minimum operating voltage $V_{MIN}$. For example, the standby voltage level $V_0$ may be set to be several hundreds of mV higher than the minimum operating voltage $V_{MIN}$. As an example, the USB controller 300 is designed to have a minimum operating voltage $V_{MIN}$ of 3.1 V and a standby voltage level $V_0$ of 3.3 V. The minimum operating voltage $V_{MIN}$ is determined depending on the manufacturing process for the USB controller 300. With a manufacturing process that will be developed in the future, the USB controller 300 has the potential to have a further reduced minimum operating voltage $V_{MIN}$.

Furthermore, (i) when the USB controller 300 has detected the device 500, the USB controller 300 turns on the output switch 204. On the other hand, (ii) when the USB controller 300 has detected no device 500, the USB controller 300 turns off the output switch 204. When the output switch 204 is turned on, the bus voltage $V_{BUS}$ having substantially the same value as the output voltage $V_{OUT}$ is output via the connector 206 (hot state). On the other hand, when the output switch 204 is turned off, the output voltage of the connector 206 becomes zero (cold state).

In the present embodiment, the USB controller 300 conforms to the USB-PD specification, and further conforms to the USB Type-C specification. The USB controller 300 is configured to select one from among multiple specified voltage levels ($V_1$=5 V, $V_2$=12 V, $V_3$=20 V) according to negotiation with the device 500.

In the present embodiment, the DC/DC converter 202 is configured as an insulated DC/DC converter. A transformer T1 includes a primary winding W1 and a secondary winding W2. A secondary-side rectifier circuit 210 is connected to the secondary winding W2, and outputs the DC voltage $V_{OUT}$. A switching transistor M1 is connected to the primary winding W1. A photocoupler 212 includes a light-emitting element 212a and a light-receiving element 212b.

A feedback circuit 220 includes a shunt regulator 222 and a voltage dividing circuit 224. The voltage dividing circuit 224 includes resistors R11 and R12. The voltage dividing circuit 224 divides the DC voltage $V_{OUT}$ so as to generate a detection voltage $V_{OUTS}$. The shunt regulator 222 is arranged such that its cathode (K) is connected to the photocoupler 212, its anode (A) is grounded, and its input (REF) receives the detection voltage $V_{OUTS}$ from the voltage dividing circuit 224 as an input signal. Specifically, the shunt regulator 222 is connected to the light-emitting element 212a of the photocoupler 212 so as to drive the light-emitting element 212a with a current $I_{ERR}$ that corresponds to the difference between the detection voltage $V_{OUTS}$ and a reference voltage $V_{REF}$ configured as the target value of the detection voltage $V_{OUTS}$. It should be noted that the bias method and the phase compensation method for the photocoupler 212 are not restricted in particular. Rather, known techniques may preferably be employed.

The primary-side controller 230 switches on and off the switching transistor M1 according to a feedback signal $V_{FB}$ that corresponds to a current $I_{FB}$ that flows through the light-receiving element 212b of the photocoupler 212. The primary-side controller 230 may be configured using known techniques. That is to say, the control method and the circuit format of the primary-side controller 230 are not restricted in particular.

The output voltage $V_{OUT}$ of the DC/DC converter 202 is stabilized to the following voltage level by means of such a feedback control operation.

$$V_{OUT}=V_{REF} \times (1+R11/R12) \quad (1)$$

As described above, the output voltage $V_{OUT}$ of the DC/DC converter 202 is switched between the specified voltage levels ($V_1$ through $V_3$) and the standby voltage level ($V_0$) according to the presence or absence of the device 500. Furthermore, such an arrangement is capable of switching the specified voltage level between the voltage levels $V_1$ through $V_3$ based on negotiation with the device 500. The USB controller 300 controls the feedback circuit 220 in order to switch the voltage level of the DC voltage $V_{OUT}$. The feedback circuit 220 is configured to be capable of changing the current $I_{ERR}$ according to the control operation of the USB controller 300.

Figure 2B:
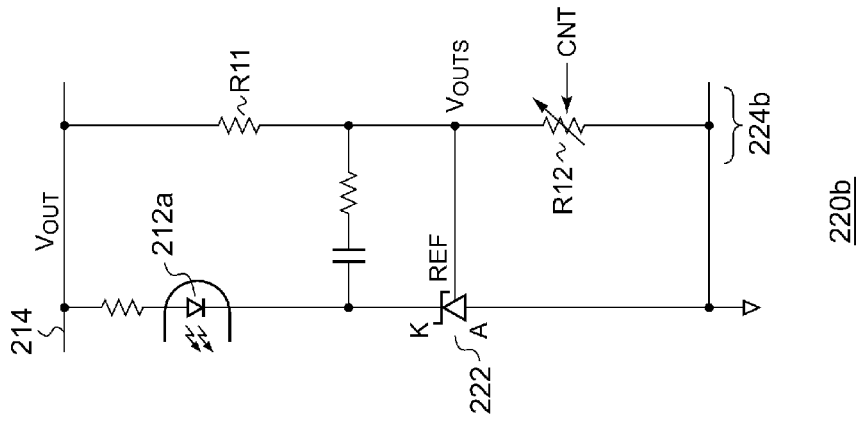
FIGS. 2A and 2B are circuit diagrams each showing an example configuration of a feedback circuit.
Figure 2A:
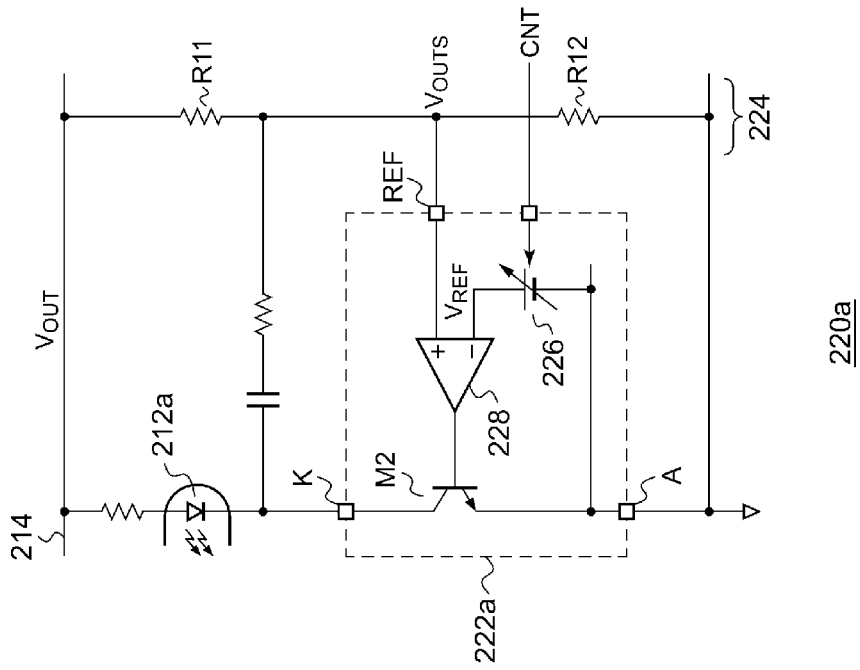

FIGS. 2A and 2B are circuit diagrams each showing an example configuration of the feedback circuit 220. A feedback circuit 220a shown in FIG. 2A is capable of changing the reference voltage $V_{REF}$, so as to switch the DC voltage $V_{OUT}$ between multiple voltage levels $V_0$, $V_1$, $V_2$, and $V_3$.

Specifically, the shunt regulator 222a includes a transistor M2, a reference voltage source 226, and an error amplifier 228. The transistor M2 is arranged between the cathode (K) terminal and the anode (A) terminal. The reference voltage source 226 is configured as a variable voltage source, and generates a variable reference voltage $V_{REF}$ according to a control signal CNT received from the USB controller 300. The output of the error amplifier 228 is connected to the control terminal (base) of the transistor M2. The error amplifier 228 amplifies the difference between the detection voltage $V_{OUTS}$ input to the REF terminal and the reference voltage $V_{REF}$.

A feedback circuit 220b shown in FIG. 2B changes the value represented by the aforementioned Expression (1), i.e., (1+R11/R12), so as to switch the DC voltage $V_{OUT}$ between the multiple voltage levels $V_0$, $V_1$, $V_2$, and $V_3$.

A voltage dividing circuit 224b shown in FIG. 2B is configured to be capable of changing the voltage division ratio represented by R12/(R11+R12). For example, the resistor R12 may be configured as a variable resistor having a resistance value that can be switched according to the control signal CNT received from the USB controller 300. Also, the resistor R11 may be configured as a variable resistor. The division ratio is configured as the reciprocal of Expression (1), i.e., the reciprocal of (1+R11/R12).

The above is the overall configuration of the power supply adapter 100. Next, description will be made regarding the USB controller 300.

Figure 3:
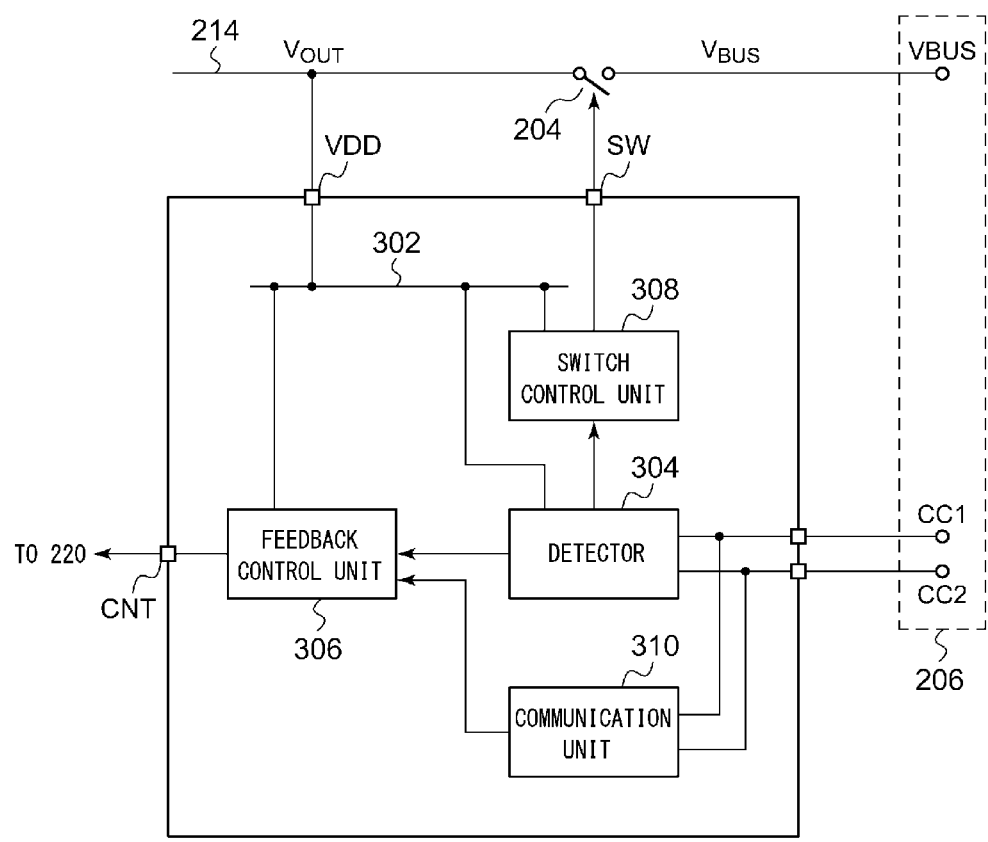
FIG. 3 is a block diagram showing a USB controller.

FIG. 3 is a block diagram showing the USB controller 300. The USB controller 300 includes a power supply line 302, a detector 304, a feedback control unit 306, a switch control unit 308, and a communication unit 310, which are configured as a function IC (Integrated Circuit) integrated on a single semiconductor substrate.

The VDD terminal is connected to the output of the secondary-side rectifier circuit 210, and receives the DC voltage $V_{OUT}$ as a power supply voltage. The DC voltage $V_{OUT}$ is supplied to an internal circuit of the USB controller 300 via the power supply line 302.

The detector 304 detects the presence or absence of the device 500. With the USB Type-C specification, the detector 304 detects the presence or absence of the device 500 (attachment or detachment of a cable) based on the state of the pin CC1/CC2 (Configuration Channel).

The feedback control unit 306 refers to the detection result obtained by the detector 304. (i) When the device 500 has been detected, the feedback control unit 306 controls the feedback circuit 220 so as to generate the DC voltage $V_{OUT}$ having a voltage level selected from among the specified voltage levels $V_1$ through $V_3$. On the other hand, (ii) when the device 500 has not been detected, the feedback control unit 306 controls the feedback circuit 220 so as to generate the DC voltage $V_{OUT}$ having the standby voltage level $V_0$. With a combination of the feedback control unit 306 and the feedback circuit 220a shown in FIG. 2A, the feedback control unit 306 controls the reference voltage $V_{REF}$. With a combination of the feedback control unit 306 and the feedback circuit 220b shown in FIG. 2B, the feedback control unit 306 controls the voltage division ratio set for the voltage dividing circuit 224b.

The USB controller 300 that supports the USB-PD specification includes the communication unit 310 that provides communication with the device 500. The bus voltage $V_{BUS}$ to be supplied to the device 500 is selected from among the multiple specified voltage levels $V_1$ through $V_3$ according to communication (negotiation) between the communication unit 310 and the device 500. The feedback control unit 306 controls the feedback circuit 220 so as to supply the voltage thus selected.

The above is the basic configuration of the USB controller 300. Next, description will be made regarding the operation of the power supply apparatus 200.

The advantages of the power supply apparatus 200 can be clearly understood in comparison with the following comparison technique. Accordingly, description will be made below regarding such a comparison technique.

[Comparison Technique]

Figure 4:
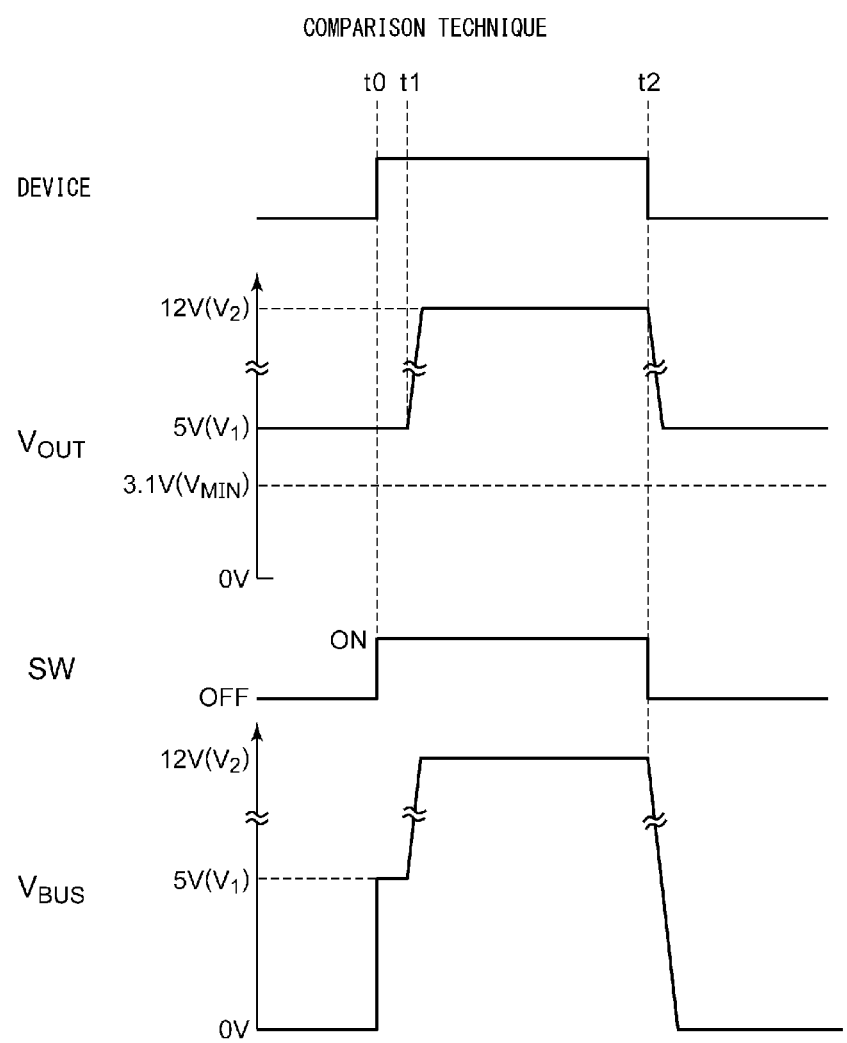
FIG. 4 is an operation waveform diagram showing the operation of a power supply apparatus according to a comparison technique.

FIG. 4 is an operation waveform diagram showing the operation of a power supply apparatus according to a comparison technique. In the comparison technique, the standby voltage level $V_0$ is not defined. FIG. 4 shows, in the following order beginning from the top, the presence or absence of connection of the device 500 (high level represents "connection", and low level represents "disconnection"), the DC voltage $V_{OUT}$, the state of the output switch 204, and the bus voltage $V_{BUS}$.

In a state in which the device 500 has not been detected (device 500 disconnection state) before the time point t0, the output switch 204 is turned off. Accordingly, the bus voltage $V_{BUS}$ is set to zero, i.e., is set to the cold state, regardless of the voltage level set for the DC voltage $V_{OUT}$.

Even in the cold state, the USB controller 300 is required to operate. Accordingly, even in this state, the DC voltage $V_{OUT}$ cannot be lowered to zero. With the comparison technique, when the device 500 is not connected, the DC voltage $V_{OUT}$ is set to the voltage level $V_1$ having the lowest voltage level (lowest specified voltage level) from among the specified voltage levels $V_1$ through V3.

At the time point t0, the device 500 is connected. During a period from the time point t0 up to the time point t1, negotiation is performed between the power supply apparatus and the device 500. During the negotiation, the bus voltage $V_{BUS}$ is set to $V_1$. Subsequently, the bus voltage $V_{BUS}$ is selected from among the multiple specified voltage levels based on the negotiation result. In this example, $V_2$=12 V is selected as the bus voltage $V_{BUS}$. At the time point t1, the DC voltage $V_{OUT}$ is raised to 12 V, and the bus voltage $V_{BUS}$ follows the DC voltage $V_{OUT}$ thus raised. Subsequently, the output voltage $V_{OUT}$ of the DC/DC converter 202 is stabilized to $V_2$=12 V. In this state, the output voltage $V_{OUT}$ of the DC/DC converter 202 is supplied to the device 500 as the bus voltage $V_{BUS}$.

When the device 500 is detached at the time point t2, the output switch 204 is turned off, which switches the power supply apparatus to the cold state. Furthermore, the output voltage $V_{OUT}$ of the DC/DC converter 202 is lowered to the lowest specified voltage level $V_1$.

Figure 5:
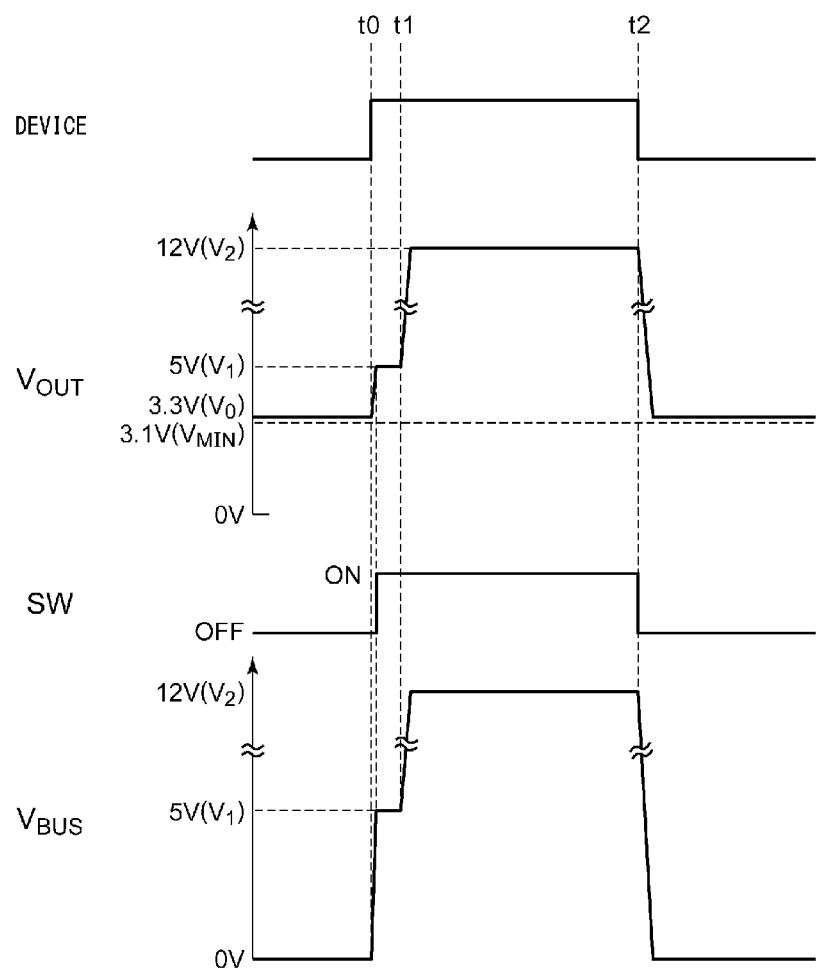
FIG. 5 is an operation waveform diagram showing the operation of a power supply apparatus according to an embodiment.

The above is description of the comparison technique. Next, description will be made with reference to FIG. 5 regarding the operation of the power supply apparatus 200 according to the embodiment. FIG. 5 is an operation waveform diagram showing the operation of the power supply apparatus 200 according to the embodiment.

In a state in which the device 500 has not been detected (device 500 disconnection state) before the time point t0, the output switch 204 is turned off, which sets the bus voltage $V_{BUS}$ to zero. That is to say, the power supply apparatus 200 is set to the cold state. In the device 500 disconnection state, with the present embodiment, the DC voltage $V_{OUT}$ is maintained at the standby voltage level $V_0$ (3.3 V) that is lower than the lowest specified voltage level $V_1$.

When the device 500 has been detected at the time point t0, the DC voltage $V_{OUT}$ is switched from 3.3 V to 5 V. After the DC voltage $V_{OUT}$ is stabilized to 5 V, the USB controller 300 turns on the output switch 204. In this state, the bus voltage $V_{BUS}$ having a voltage level of 5 V is supplied to the device 500. Subsequently, the voltage level of the bus voltage $V_{BUS}$ is determined to be the specified voltage level $V_2$ based on the negotiation result. At the time point t1, the voltage level of the DC voltage $V_{OUT}$ is switched to 12 V.

When the device 500 has been detached at the time point t2, the output switch 204 is turned off, which switches the power supply apparatus to the cold state. Furthermore, the output voltage $V_{OUT}$ of the DC/DC converter 202 is lowered to the standby voltage level $V_0$.

The above is the operation of the power supply apparatus 200 according to the embodiment.

With such a comparison technique, in the period between the time point t0 and the time point t1, the power consumption of the USB controller 300 is represented by $V_1 \times I_1$. In contrast, with the embodiment, such an arrangement is capable of providing reduced power consumption as represented by $V_0 \times I_1$. In a case in which $V_1$=5 V and $V_0$=3.3 V, such an arrangement is capable of providing the USB controller 300 with a reduction of 30% or more in power consumption in the standby state.

Furthermore, in the standby state, in addition to the USB controller 300, the feedback circuit 220 also consumes electric power. Specifically, the voltage dividing circuit 224 consumes electric power represented by $V_{OUT}^2/(R1+R2)$. Thus, such an arrangement is capable of also providing the voltage dividing circuit 224 with a reduction of 30% or more in power consumption.

In addition, the photocoupler 212 and the shunt regulator 222 also consume electric power as represented by $I_{ERR} \times V_{OUT}$. Thus, such an arrangement is capable of also providing the photocoupler 212 and the shunt regulator 222 with a reduction of 30% or more in power consumption.

As described above, with the power supply apparatus 200 according to the embodiment, the standby voltage level $V_0$ is determined such that it is lower than the minimum specified voltage level $V_1$ defined in the USB standard. With such an arrangement, the DC/DC converter 202 is configured to be capable of generating the DC voltage $V_{OUT}$ having the standby voltage level $V_0$. When the device 500 is not connected to the power supply apparatus 200, the output voltage $V_{OUT}$ of the DC/DC converter 202 is lowered to $V_0$, thereby providing the USB controller 300 and the secondary side of the DC/DC converter 202 with a reduction in power consumption in the standby state.

FIG. 6 is a function block diagram showing the USB controller 300 that conforms to the USB-PD specification and the USB Type-C specification.

A control logic unit 320 integrally controls the overall operation of the USB controller 300. An interface circuit 330 functions as a physical layer (PHY) of a configuration channel (CC). A bus voltage detector 332 detects and monitors the bus voltage $V_{BUS}$. A port detector 334 detects whether or not the device 500 is connected to the CC1/CC2 port (pin). Furthermore, with the USB Type-C specification, such an arrangement is capable of detecting the orientation of a reversible cable. A transceiver 336 includes a transmitter (BB-TX) and a receiver (BB-RX), and communicates with the device 500 via the configuration channel.

A switch driver 340 controls an on/off operation of the output switch 204 according to an instruction from the control logic unit 320. The switch driver 340 includes an unshown charge pump circuit.

A discharge circuit 342 is connected to the output of the secondary-side rectifier circuit 210. The discharge circuit 342 turns on according to an instruction from the control logic unit 320, which discharges the charge stored in an output capacitor C1 included in the secondary-side rectifier circuit 210. A voltage monitoring unit 344 monitors the output voltage $V_{OUT}$ of the secondary-side rectifier circuit 210. The monitoring result is input to the control logic unit 320.

The discharge circuit 346 is connected to the connector side of the output switch 204. The discharge circuit 346 turns on according to an instruction from the control logic unit 320, which discharges the charge stored on the connector side. A voltage monitoring unit 348 monitors the bus voltage $V_{BUS}$. The monitoring result is input to the control logic unit 320.

A current detection circuit 350 detects a current supplied to the device 500 via the output switch 204. The detection result is input to the control logic unit 320.

Description will be made again with reference to FIG. 5 regarding the operation of the USB controller 300 shown in FIG. 6. The port detector 334 monitors the state of the CC port so as to detect whether or not the device 500 is connected. Furthermore, with the USB Type-C specification, the cable is configured as a reversible cable having a front/back symmetrical structure. When the cable is connected, the device 500 is connected to either the CC1 port or the CC2 port. The port detector 334 judges whether the device 500 is connected to the CC1 port or the CC2 port. It can be said that the port detector 334 corresponds to the detector 304 shown in FIG. 3.

Before the time point (time point 0) at which the port detector 334 has detected the device 500, the control logic unit 320 instructs the switch driver 340 to turn off the output switch 204. This sets the output to the cold state. It can be said that a part of the control logic unit 320 and the switch driver 340 correspond to the switch control unit 308 shown in FIG. 3.

Furthermore, in this state, the control logic unit 320 controls the feedback circuit 220 such that the output $V_{OUT}$ of the DC/DC converter 202 becomes $V_0$. It can be said that a part of the control logic unit 320 corresponds to the feedback control unit 306 shown in FIG. 3.

At the time point t0, the port detector 334 detects the device 500. In this state, the control logic unit 320 controls the feedback circuit 220 such that the output $V_{OUT}$ of the DC/DC converter 202 becomes $V_1$ (=5 V). Furthermore, the control logic unit 320 instructs the switch driver 340 to turn on the output switch 204. This establishes a Type-C connection.

After the Type-C connection has been established, negotiation is performed between the transceiver 336 and the device 500. In this step, the target level of the bus voltage $V_{BUS}$ is selected from among the specified voltage levels $V_1$ through $V_3$. In this example, the specified voltage level $V_2$=12 V is selected. At the time point t1, the control logic unit 320 controls the feedback circuit 220 such that the output $V_{OUT}$ of the DC/DC converter 202 becomes $V_2$ (=12 V). When the bus voltage $V_{BUS}$ reaches the specified voltage level $V_2$ thus selected, the control logic unit 320 asserts a flag PS_READY.

After the time point t1, the port detector 334 repeatedly monitors the device 500, and detects whether or not the cable or otherwise the device 500 is disconnected. When the device 500 has been disconnected at the time point t2, the control logic unit 320 lowers the output voltage $V_{OUT}$ to the standby voltage level $V_0$. Furthermore, the control logic unit 320 turns off the output switch 204. The above is the operation of the USB controller 300 shown in FIG. 6.

Figure 7A:
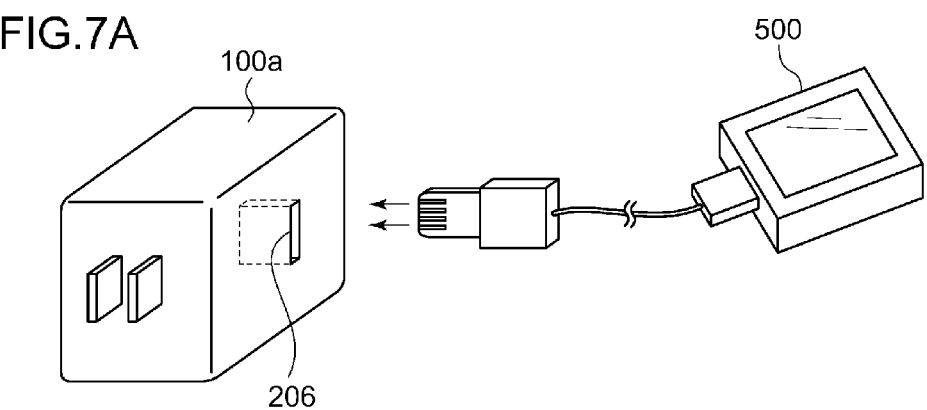
FIGS. 7A and 7B are external views each showing a power supply adapter.
Figure 7B:
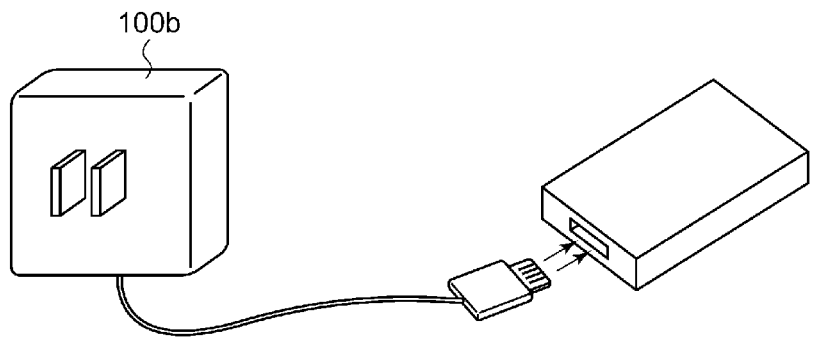

FIGS. 7A and 7B are external views each showing the power supply adapter 100. A power supply adapter 100a shown in FIG. 7A is referred to as a "receptacle output type power supply adapter". Such a power supply adapter 100a includes the connector 206 configured as a receptacle (female connector). With such a type of power supply adapter, when the device 500 is not connected, there is a need to set the output to the cold state.

A power supply adapter 100b shown in FIG. 7B is referred to as a "captive cable type power supply adapter" having a plug (cable) output configuration. With such a type of power supply adapter, it is recommended that the output be set to the cold state when the device 500 is disconnected. However, such a type of power supply adapter allows the output to be maintained in the hot state even when the device 500 is not connected. That is to say, with the power supply adapter 100b shown in FIG. 7B, the output switch 204 may be omitted.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description has been made in the embodiment regarding the USB controller 300 that supports both the USB-PD specification and the USB Type-C specification. However, the present invention is not restricted to such an arrangement.

(i) For example, the present invention is also applicable to the USB controller 300 that supports only the USB Type-C specification. In this case, with such an arrangement, only $V_1$=5 V is prepared as the specified voltage level. Also, the DC/DC converter 202 may preferably be configured to switch the DC voltage $V_{OUT}$ between two values, i.e., $V_0$ and $V_1$.

(ii) Conversely, the present invention is also applicable to the USB controller 300 that supports only the USB-PD specification. In this case, a function for detecting the cable orientation or the like may be omitted.

[Second Modification]

Description has been made in the embodiment regarding the USB controller 300. However, the present invention is not restricted to such an arrangement. In addition to the present USB standard, the present invention is applicable to other USB standards which will be developed in the future, and voltage supply systems employing a similar architecture derived from the USB standard. Also, the kind of bus is not restricted to such a USB bus. Also, the present invention is applicable to other standards that differ from the USB standard, examples of which include the Quick Charge standard. The Quick Charge standard (Quick Charge 2.0) supports bus voltages $V_{BUS}$ of 5 V, 9 V, and 12 V.

[Third Modification]

Description has been made in the embodiment regarding the DC/DC converter 202 configured as a flyback converter. However, the topology of the DC/DC converter 202 is not restricted in particular. For example, the DC/DC converter 202 may be configured as a synchronous rectification DC/DC converter. Also, the DC/DC converter 202 may be configured as a forward converter. Also, the DC/DC converter 202 may be configured as a converter employing an inductor, instead of a converter employing the transformer T1.

[Fourth Modification]

The power supply adapter 100 is not restricted to such an AC power supply adapter as shown in FIGS. 7A and 7B. With the USB-PD specification, it is assumed that the power supply adapter 100 is mounted on various kinds of electronic devices such as TVs, computers, and the like, so as to support a bus voltage supply function. Thus, the power supply adapter 100 may be built into such an electronic device.

[Fifth Modification]

All of or a part of the feedback circuit 220 may be built into the USB controller 300.

While the preferred embodiments of the present invention have been described using specific terms, such description is for illustrative purposes only, and it is to be understood that changes and variations may be made without departing from the spirit or scope of the appended claims.

What is claimed is:

1. A bus controller that is employed together with a DC/DC converter that generates a DC voltage used as a bus voltage to be supplied to a detachable device, and that is configured as a power supply apparatus, wherein the DC/DC converter comprises:
   a transformer having a primary winding and a secondary winding;
   a secondary-side rectifier circuit that is connected to the secondary winding, so as to output the DC voltage, wherein the secondary-side rectifier circuit includes an output capacitor;
   a switching transistor connected to the primary winding;
   a photocoupler comprising a light-emitting element and a light-receiving element;
   a feedback circuit comprising a shunt regulator connected to the light-emitting element of the photocoupler and structured to generate a reference voltage which is variable according to a control signal and to drive the light-emitting element with a current that corresponds to a difference between a detection voltage that corresponds to the DC voltage and the reference voltage;
   a primary-side controller structured to switch on and off the switching transistor according to a feedback signal that corresponds to a current that flows through the light-receiving element of the photocoupler;
   a connector to which the device is detachably connected;
   an output switch arranged between an output of the secondary-side rectifier circuit and the connector, and
   the bus controller arranged on a secondary side of the transformer, and that detects whether or not the device is connected or disconnected,
   wherein the power supply terminal of the bus controller is connected between the output of the secondary-side rectifier circuit and the output switch
   and wherein the bus controller comprises:
      a power supply terminal that is connected to an output of the secondary-side rectifier circuit, and structured to receive the DC voltage as a power supply voltage;
      a detector structured to detect whether or not the device is connected;
      a feedback control unit structured to output the control signal to control the reference voltage in the feedback circuit such that (i) when the device is detected, the DC voltage is generated so as to have a specified voltage level, and such that (ii) when the device is not detected, the DC voltage is generated so as to have a voltage level that is lower than the specified voltage level and that is higher than a minimum operating voltage required to operate the bus controller;
      a control logic unit;
      a first discharge circuit coupled to the output of the secondary-side rectifier circuit and structured to discharge a charge stored in an output capacitor according to an instruction from the control logic unit; and
      a second discharge circuit coupled to the connector side of the output switch and structured to discharge a charge stored on the connector side according to an instruction from the control logic unit.

2. The bus controller according to claim 1, further comprising a switch control unit structure to perform a control operation such that (i) when the device is detected, the output switch is turned on, and such that (ii) when the device is not detected, the output switch is turned off.

3. The bus controller according to claim 1, further comprising a communication unit structured to communicate with the device,
   wherein the feedback control unit is structured to select one from among a plurality of specified voltage levels based on a communication between the communication unit and the device.

4. The bus controller according to claim 1, wherein at least two of the power supply terminal, the detector and the feedback control unit of the power supply terminal are monolithically integrated on a single semiconductor substrate.

5. The bus controller according to claim 1, that conforms to the USB Type-C specification.

6. The bus controller according to claim 1, that conforms to the USB-PD specification.

7. The bus controller according to claim 1, that conforms to the Quick Charge specification.

8. The bus controller according to claim 1, wherein the shunt regulator comprises a reference voltage source configured as a variable voltage source, and structured to generate the reference voltage according to the control signal.

9. A power supply adapter that supplies a bus voltage to a detachable device, the power supply adapter comprising:
   an input rectifier circuit structured to rectify an AC voltage;
   a DC/DC converter structured to receive an output voltage of the input rectifier circuit so as to generate a DC voltage to be used as the bus voltage wherein the DC/DC converter comprises:
      a transformer having a primary winding and a secondary winding;
      a secondary-side rectifier circuit that is connected to the secondary winding, so as to output the DC voltage, wherein the secondary-side rectifier circuit includes an output capacitor;
      a switching transistor connected to the primary winding;
      a photocoupler comprising a light-emitting element and a light-receiving element;
      a feedback circuit comprising a shunt regulator connected to the light-emitting element of the photocoupler and structured to generate a reference voltage which is variable according to a control signal and to drive the light-emitting element with a current that corresponds to a difference between a detection voltage that corresponds to the DC voltage and the reference voltage;
      a primary-side controller structured to switch on and off the switching transistor according to a feedback signal that corresponds to a current that flows through the light-receiving element of the photocoupler;
   a connector to which the device is detachably connected;
   an output switch arranged between an output of the secondary-side rectifier circuit and the connector, and
   the bus controller arranged on a secondary side of the transformer, and that detects whether or not the detachable device is connected or disconnected,
   wherein the power supply terminal of the bus controller is connected between the output of the secondary-side rectifier circuit and the output switch,
   and wherein the bus controller comprises:
      a power supply terminal that is connected to an output of the secondary-side rectifier circuit, and structured to receive the DC voltage as a power supply voltage;

a detector structured to detect whether or not the device is connected;

a feedback control unit structured to output the control signal to control the reference voltage in the feedback circuit such that (i) when the device is detected, the DC voltage is generated so as to have a specified voltage level, and such that (ii) when the device is not detected, the DC voltage is generated so as to have a voltage level that is lower than the specified voltage level and that is higher than a minimum operating voltage required to operate the bus controller;

a control logic unit;

a first discharge circuit coupled to the output of the secondary-side rectifier circuit and structured to discharge a charge stored in an output capacitor according to an instruction from the control logic unit; and a second discharge circuit coupled to the connector side of the output switch and structured to discharge a charge stored on the connector side according to an instruction from the control logic unit.

* * * * *